US010542298B2

(12) United States Patent
Tallamy et al.

(10) Patent No.: US 10,542,298 B2
(45) Date of Patent: Jan. 21, 2020

(54) AUTONOMOUSLY GENERATED VIDEO CHANNELS

(71) Applicant: Cisco Technology, Inc., San Jose, CA (US)

(72) Inventors: Stephen Tallamy, Sandhurst (GB); Pete Rai, Egham (GB); Colin John Davies, Sandleheath (GB); Simon Dyke, Lyndhurst (GB); Olivier Frebourg, Southampton (GB)

(73) Assignee: Cisco Technology, Inc., San Jose, CA (US)

( * ) Notice: Subject to any disclaimer, the term of this patent is extended or adjusted under 35 U.S.C. 154(b) by 5 days.

(21) Appl. No.: 15/447,215

(22) Filed: Mar. 2, 2017

(65) Prior Publication Data

US 2018/0255336 A1    Sep. 6, 2018

(51) Int. Cl.
| | |
|---|---|
| *H04N 21/234* | (2011.01) |
| *H04N 21/2187* | (2011.01) |
| *H04N 21/258* | (2011.01) |
| *H04N 21/2668* | (2011.01) |
| *H04N 21/25* | (2011.01) |
| *H04N 21/475* | (2011.01) |
| *H04N 21/2665* | (2011.01) |

(52) U.S. Cl.
CPC ... *H04N 21/23418* (2013.01); *H04N 21/2187* (2013.01); *H04N 21/25891* (2013.01); *H04N 21/252* (2013.01); *H04N 21/2665* (2013.01); *H04N 21/2668* (2013.01); *H04N 21/4756* (2013.01)

(58) Field of Classification Search
None
See application file for complete search history.

(56) References Cited

U.S. PATENT DOCUMENTS

| | | | |
|---|---|---|---|
| 8,301,731 | B2 | 10/2012 | Naimark et al. |
| 9,142,257 | B2 | 9/2015 | Woodman |
| 9,462,028 | B1 | 10/2016 | Levinson et al. |
| 2013/0271655 | A1 | 10/2013 | Krahnstoever et al. |
| 2014/0089801 | A1* | 3/2014 | Agrawal ............... G06F 3/0484 715/719 |

(Continued)

OTHER PUBLICATIONS

Periscope TV from the Editors; available on the web at: https://www.periscope.tv/?channelMenu=true; accessed on Jan. 9, 2017.

(Continued)

*Primary Examiner* — James R Marandi
(74) *Attorney, Agent, or Firm* — Merchant & Gould P.C.

(57) ABSTRACT

A method for generating ad hoc video stream channels is implemented on at least one computing device and includes: receiving a multiplicity of incoming user video feeds, where schedules for the incoming user video feeds are unknown; classifying the multiplicity of incoming user video feeds according to at least a genre; selecting at least one incoming video feed from among the multiplicity of incoming user video feeds for inclusion in at least one video stream channel, where the selecting is according to selection criteria, and the selection criteria are based at least on the classifying; generating at least one outgoing video stream for the at least one video stream channel according to the selecting; and delivering the at least one outgoing video stream to presentation devices.

20 Claims, 4 Drawing Sheets

(56) References Cited

U.S. PATENT DOCUMENTS

| | | | |
|---|---|---|---|
| 2014/0172863 A1* | 6/2014 | Imbruce | G06F 17/212 |
| | | | 707/740 |
| 2014/0294361 A1* | 10/2014 | Acharya | G11B 27/10 |
| | | | 286/241 |
| 2015/0139615 A1* | 5/2015 | Hill | H04N 21/2743 |
| | | | 386/285 |
| 2016/0277802 A1 | 9/2016 | Bernstein et al. | |
| 2016/0286244 A1* | 9/2016 | Chang | H04N 21/21805 |
| 2016/0294894 A1* | 10/2016 | Miller | H04L 51/32 |
| 2017/0147170 A1* | 5/2017 | Hellier | G06F 3/0482 |

OTHER PUBLICATIONS

A New Periscope.tv; available on the web at: https://medium.com/@periscope/a-new-periscope-tv-a2e65c6e39b#.frg79y52w; accessed on Jan. 9, 2017.

Administrator Guide for Cisco Show and Share Release 5.6; Cisco Systems, Inc., 2015.

Ingraham, Nathan, Engagenet; Periscope's website now organizes live videos into good old channels; Sep. 29, 2016, available on the web at: https://www.engadget.com/2016/09/29/periscopes-website-now-organizes-live-videos-into-good-old-chan/.

Johnson, Lauren; Will People Pay to Watch Mobile Livestreams? This Startup Is About to Find Out Hang w/starts charging for views; Aug. 4, 2015; available on the web at: http://www.adweek.com/news/technology/will-people-pay-watch-mobile-livestreams-startup-about-find-out-166231.

Mogg, Trevor (Digital Trends.com); Periscope's new Couchmode feature lets you explore random streams fast; Aug. 4, 2015; available on the web at: http://www.digitaltrends.com/social-media/periscope-new-couchmode-feature-for-desktop-lets-you-explore-random-streams-fast/.

Wardle, Claire et al; Tow Center for Digital Journalism, Columbia University, Amateur Footage: A Global Study of User-Generated Content in TV; Apr. 2014.

Prat, Yann Joel et al; Multi-Video Event in IP.com; ; Dec. 4, 2014.

Prat, Yann Joel et al; Adaptive Camera View for Video Applications in IP.com; Dec. 4, 2014.

* cited by examiner

AUTONOMOUSLY GENERATED VIDEO CHANNELS

FIELD OF THE INVENTION

The present invention generally relates to the autonomous generation of a video stream based on user generated video from multiple sources.

BACKGROUND OF THE INVENTION

Consumer generated video, or user-generated video, is content shot by a non-professional. With the increasing availability of mobile bandwidth and availability of connected high quality mobile video capture devices (e.g., mobile phones, GoPro, etc.), there is a rising trend of the distribution of user generated live video, supported by applications such as YouTube Live, Periscope, Facebook Live Streaming, and uStream.

BRIEF DESCRIPTION OF THE DRAWINGS

The present invention will be understood and appreciated more fully from the following detailed description, taken in conjunction with the drawings in which.

DESCRIPTION OF EXAMPLE EMBODIMENTS

Overview

A method for generating ad hoc video stream channels is implemented on at least one computing device and includes: receiving a multiplicity of incoming user video feeds, where schedules for the incoming user video feeds are unknown; classifying the multiplicity of incoming user video feeds according to at least a genre; selecting at least one incoming video feed from among the multiplicity of incoming user video feeds for inclusion in at least one video stream channel, where the selecting is according to selection criteria, and the selection criteria are based at least on the classifying; generating at least one outgoing video stream for the at least one video stream channel according to the selecting; and delivering the at least one outgoing video stream to presentation devices.

Description

The nature of user generated video delivery is typically different than that of professional video delivery. Unlike professional video delivery, delivery of user generated video is typically unscheduled, lacks pre-defined content durations, and has little descriptive metadata. For live events, there may also be multiple uncoordinated live user generated feeds for the same event. These circumstances present various content discovery challenges for audiences wishing to consume this video.

Figure 1:
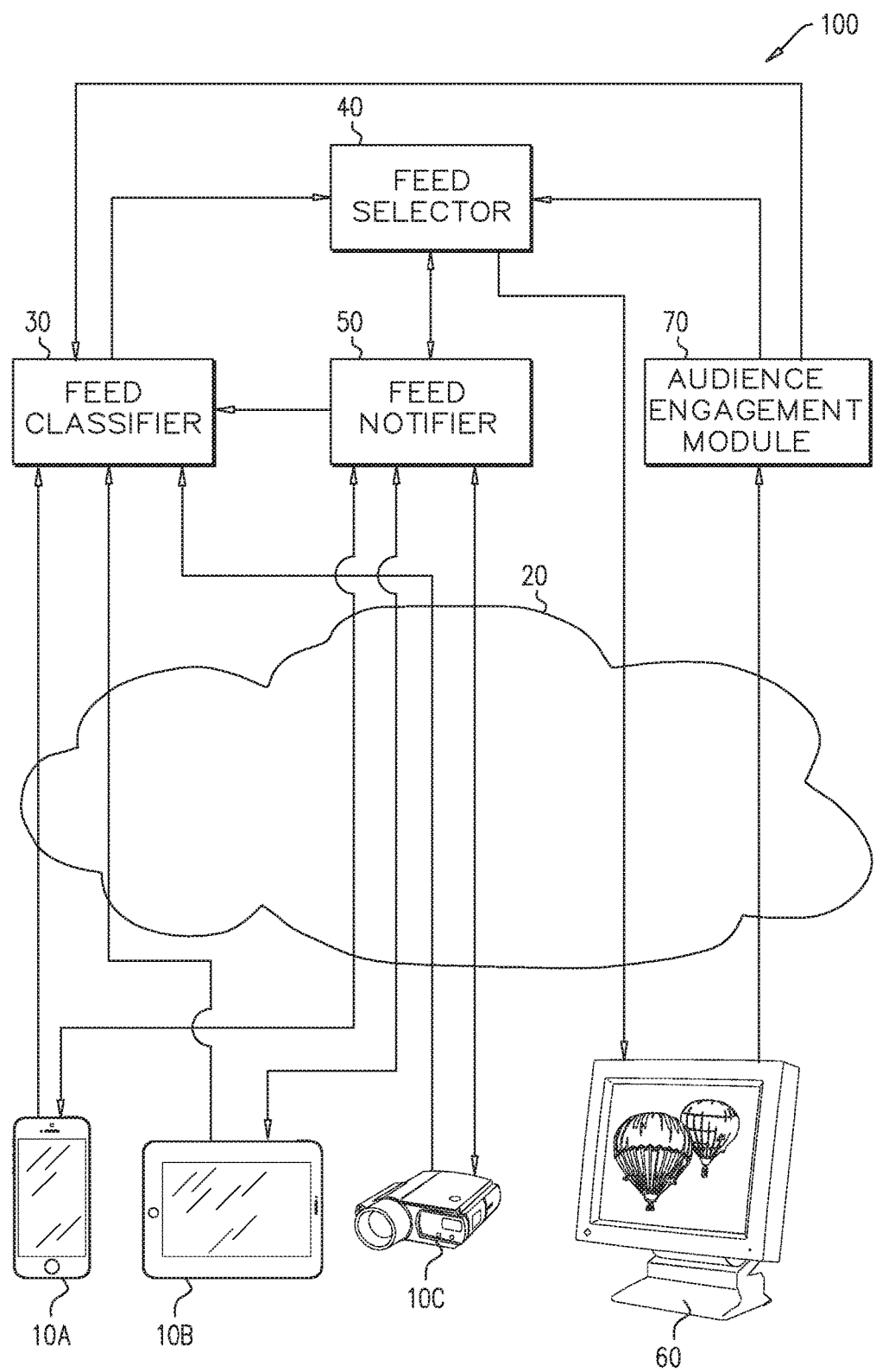
FIG. 1 is a partly pictorial, partly schematic illustration of an exemplary user generated video delivery system, constructed and operative in accordance with embodiments described herein.

Reference is now made to FIG. 1 which depicts an exemplary user generated video ad hoc delivery system 100, constructed and operative in accordance with embodiments described herein. System 100 comprises feed classifier 30, feed selector 40, feed notifier 50 and audience engagement module 70. It will be appreciated that while the elements of system 100 may be depicted as independent components, some or all of these elements may be integrated in one or more physical units, e.g., as a user generated video delivery server.

User generated delivery system 100 may generate continuous video streams channels from user generated live feeds on an ad hoc basis, where the provision of the feeds is not necessarily scheduled or coordinated vis-à-vis the operation of system 100. Each such video stream may consist of at least one current live user video feed, i.e., a feed of user generated video provided to system 100 generally as it is produced. Some of the video streams may provide a continuous, typically (although not necessarily) live, viewing experience; other video streams may be provided for a certain amount of time. For example, "pop-up" streams may be created to address a particular event, such as a music festival or sporting tournament.

In operation, feed classifier 30 may classify user video feeds received from user video devices 10 over a communications network (e.g., Internet 20). For example, feed classifier 30 may extract metadata from a user generated video feed to aid downstream selection by feed selector 40. It will be appreciated that a user video device 10 may be any device suitable for the capture of user generated video. For example, as depicted in FIG. 1, user video device 10A may be a smartphone; user video device 10B may be a computer tablet; and user video device 10C may be a video camera.

System 100 is configured to autonomously switch to another available user generated video feed upon termination of a user video feed included in a current video stream. Additionally, system 100 may time-shift previously captured user video feeds for inclusion in a current video stream if no suitable live options are available. Alternatively, or in addition, system 100 may also switch to a different live user video feed if audience engagement levels for the current live video stream drop significantly (i.e., as per information received from audience engagement module 70 as described hereinbelow) and an alternative live user video feed is available for inclusion in the current video stream. Selection and replacement of user video feeds for inclusion in a video stream is performed by feed selector 40.

Feed selector 40 may generate continuous channel-like video streams from classified user video feeds selected from among user video feeds received from feed classifier 30. The video streams may be provided for viewing on user presentation devices, e.g., user presentation device 60. Audience engagement module 70 may receive audience engagement feedback from user presentation device 60. Module 70 may evaluate and/or aggregate the feedback before making it available to feed selector 40. Feed selector 40 may then use the feedback to refine selection criteria for the user video feeds.

Figure 2:
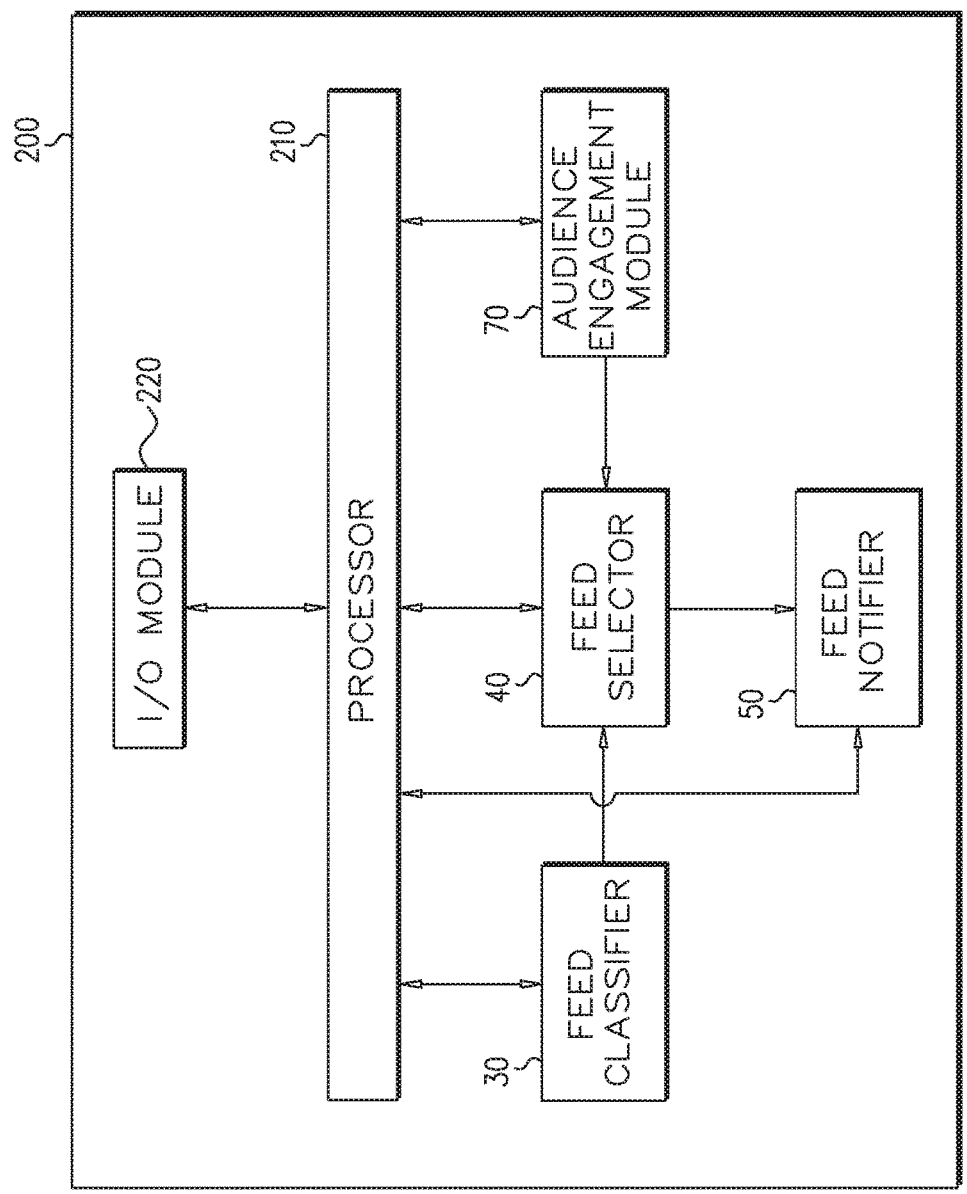
FIG. 2 is a schematic illustration of a user video delivery server, constructed and operative to deliver user generated video within the context of the system of FIG. 1.

Reference is now made to FIG. 2 which is a block diagram of an exemplary user video delivery server 200, constructed and operative in accordance with embodiments described herein. As depicted in FIG. 2, server 200 may comprise feed classifier 30, feed selector 40, feed notifier 50 and audience engagement module 70. It will however be appreciated that as noted hereinabove, some, or all, of these elements may be provided as independent components.

Server 200 also comprises processor 210 and I/O module 220. I/O module 220 may be implemented as a transceiver or similar means suitable for transmitting and receiving data between server 200 and other devices, such as, for example, user video devices 10 and user presentation device 60. Such data may be, for example, user video feeds generated by user video devices 10, and/or video streams transmitted to user presentation device 60. It will be appreciated that in some embodiments the functionality of I/O module 220 may be shared by multiple components, such as, for example, a transceiver configured to receiver data over the Internet, and a satellite transmitter configured to broadcast video stream channels. It will be appreciated that if any of feed classifier 30, feed selector 40, feed notifier 50 and audience engagement module 70 are implemented as independent components, each such independent component may also comprise a processor and I/O module analogous to processor 210 and I/O module 220.

It will also be appreciated that server 200 may comprise more than one processor 210. For example, one or more such processors 210 may be implemented as special purpose processors operative to execute any one or more of feed classifier 30, feed selector 40, feed notifier 50 and audience engagement module 70. Feed classifier 30, feed selector 40, feed notifier 50 and audience engagement module 70 may be applications implemented in software and/or hardware that may be operative to provide the functionalities described herein.

In operation, feed classifier 30 receives user video feeds from user video devices 10, e.g., via I/O module 220. In accordance with embodiments described herein, the user video feeds may be harvested from user video publishing sites such as, for example, Periscope. Alternatively, or in addition, users may directly provide the consumer video feeds to feed classifier 30. For example, users may register as user feed providers with system 100 and upload their feeds to feed classifier, e.g., by using a uniform resource locator (URL) for feed classifier 30, or by installing a local client application configured to upload user video feeds to feed classifier 30. Alternatively, or in addition, user video feeds may be proactively provided by a user video publishing site. It will in any case be appreciated that the availability of user video feeds for use by system 100 may be subject to restriction according to copyright laws, etc.

Feed classifier 30 may be configured to generate and/or use a variety of metadata for each user feed received. Some of this metadata may be generated by user video device 10 (and/or input by its user) and included with the user video feed. For example, the user video feed may include metadata such as the location where the user video feed was captured; the author's name (e.g., per a name entered for the user of user video device 10); time/date of video capture; descriptive data/tags; video orientation; etc.

Feed classifier 30 may also be configured to generate video analysis metrics on the user video feed. For example, feed classifier 30 may assess video resolution, audio quality, distortion detection, color balance, and/or focus for the user video feed.

Feed classifier 30 may also be configured to perform timeline analysis on the user video feed, for example, using speech-to-text and/or audio recognition to pull out key words from dialogue and/or identify sounds, such as the sound of waves on a beach. Feed classifier 30 may also be configured to perform object detection in the user video feed. For example, Feed classifier 30 may detect recurring instances of footballs and/or multiple instances of football helmets in the user video feed, thereby indicating that it is from a sports event, specifically a football game.

Feed classifier 30 may also access historical audience engagement statistics provided by audience engagement module 70 that relate in some fashion to the feed. Such statistics may be, for example, related to previous audience feedback for user video feeds associated with the same location (as per, for example, the metadata in the user video feed discussed hereinabove), thereby indicating to some extent whether or not audiences may be interested in the current user video feed. Alternatively, or in addition, such statistics may be for user video feeds associated with the same author. It will be appreciated that there may be other relevant examples; such statistics may be compiled for any suitable data point associated with a user video feed.

Feed selector 40 is operative to receive the now classified user video feeds from feed classifier 30 and to use these feeds to generate continuous (to the extent possible) output video streams. Feed selector 40 may autonomously generate the output video streams from similar user video feeds, for example, where the user video feeds are associated by location, hashtag, social graph, live video analysis etc. It will be appreciated that feed selector 40 may use metadata received from the feed classifier 30 to relate different user generated feeds together. For example, feed selector 40 may generate a sports channel from one or more sports-related user video feeds received from feed classifier 30. In such an example, for one of the user video feeds, as described hereinabove, feed classifier 30 may have identified a recurring object identified as a football; accordingly, feed classifier 30 may add metadata indicating that it is associated with a sports event. Feed classifier 30 may have harvested a tag: "baseball" from a second user video feed. Accordingly, feed classifier 30 may add metadata indicating that the second user video feed is also associated with a sports event. Feed selector 40 may receive both of these user video feeds and use them to generate an output video stream for a sports channel.

Feed classifier may also be operative to identify a common event or venue at which different user video feeds have been produced. For example, feed classifier 30 may harvest identifying tags such as "#Inauguration" or "#SuperBowl" from multiple feeds, thereby indicating that they are associated with a common event or venue.

Feed selector 40 may apply various algorithms to generate continuous output video streams. These algorithms may, for example, attempt to maximize audience engagement for the video stream, and thereby increase viewership. For example, the feed selector 40 may select similarly classified feeds (e.g., both related to sports events) to keep a viewer engaged with a particular subject. In another example, feed selector 40 may deliberately select differently classified feeds in order to provide a varied viewing experience to the viewer.

It will be appreciated that feed selector 40 may assign multiple user video feeds to the same channel, i.e., the same continuous video stream. It will similarly be appreciated that two or more user video feeds in the same channel may be provided live from their respective user video devices 10 at the same time. Accordingly, feed selector 40 may be configured to generate an output video stream for the channel by selecting one of the two or more user video feeds for live transmission.

Feed selector 40 may also be configured to splice two or more user video feeds together to generate an output video stream for the channel. It will be appreciated that the output video stream may also include an audio track. When splicing two or more user video feeds together, feed selector 40 may select an audio track from one of the spliced user video feeds to be included in the output video stream. This selection may be based, for example, on the existence of an audio track (some user video feeds may not have an audio component), or a perceived quality of the audio track(s) as per feed classifier 30.

In accordance with embodiments described herein, feed classifier 30 may alternatively include an audio track from a user video feed not included in the spliced user video feed. It will be appreciated that if feed selector 40 splices together an audio track and video from two different user generated feeds, the video and audio may not necessarily be synchronized. Feed selector 40 may therefore timeshift the video slightly to maintain synchronization with the audio track. For example, feed selector 40 may accomplish this by monitoring the audio feeds of both of the user generated feeds (i.e., both the feed from which the audio track is included and the feed from which the video is included) and delay one feed such that it "beat matches" the other, i.e., that the audio of the different feeds generally align with each other. Then an audio track may be picked from either feed based on criteria such as perceived quality and/or strength (or even switched if the values for these criteria change). In some cases, feed selector 40 may determine that there is too much drift between two video feeds and stop attempting to stitch audio in this manner. For example, when two user generated feeds come from users documenting a parade from different vantage points. In such a case, the video may be dissimilar and the audio may be too heavily influenced by the ambient noise in the different vantage points to synchronize the audio tracks.

In order to provide a continuous output video stream for a given channel, feed selector 40 may also be configured to replace a currently provided user video feed with another user video feed when the currently provided user feed channel terminates, i.e., when the associated user video device 10 stops providing the user video feed to server 100. Feed selector 40 may also be configured to switch between two or more live user video feeds associated with the same channel even if the user video feed currently being provided has not yet terminated. For example, when, as per classification by feed classifier 30, two or more user video feeds may be received for the same live event (e.g., a sports event, or a political rally where multiple users of user video devices 10 may be providing a live user video feed from the same approximate venue), feed selector 40 may switch between the user video feeds according to a variety of criteria including timeline metadata, detection of audio and/or movement, resolution quality, focus, etc.

Feed selector 40 may also be configured to switch between two or more user video feeds that are associated with the same channel, but associated with different events. For example, a channel may be generated as a sports magazine channel. Feed selector 40 may alternate between selection of a user video feed of a baseball game and a user video feed of a football game. Feed selector 40 may determine which user video feed to include in the channel's video stream based on metadata provided by source user video devices 10 and/or feed classifier 30. For example, the users of user video devices 10 may add tags for the end of innings for the baseball game and/or changes of possession for the football game. When such a tag appears in the user video feed currently included in the channel's video stream, feed selector 40 may switch to including a different user video feed in the channel's video stream, thereby minimizing breaks in the action for the channel. It will be appreciated that other switching logic may also be supported by the embodiments described herein.

Feed selector 40 may also apply some time shifting to improve the effect when generating output video streams. For example, feed selector 40 may cut between user video feeds from different performances at a music festival. Feed selector 40 may employ song detection methods to indicate the appropriate splice points and then time shift the transmission of the user video feeds to avoid missing the beginning of a song. Alternatively, or in addition, timeline metadata may be used to determine the splice points.

Feed selector 40 may be configured to analyze previous stream selection choices received from audience engagement module 70 to build and refine models of selection strategies for increasing audience engagement. As described hereinabove, feed selector 40 may receive input from both feed classifier 30 and audience engagement module 70. It will, however, be appreciated that other modules or entities may provide input information for feed selector 40. For example, feed selector 40 may be operative to accept input from a human operator, e.g. enabling a curator to define criteria according to which user video feeds may be amalgamated into an output channel video stream. Alternatively, or in addition, an individual user, e.g., the user of user video presentation device 60, may also proactively provide selection criteria to feed selector 40. For example, feed selector 40 may use user-entered information (e.g. age) or preferences (such as hobbies) to define, at least in part, selection criteria for a personalized video stream.

In a similar manner, user video channels may also be branded and/or curated by individuals or organizations. For example, a technology blog may use such functionality to generate a channel from live feeds of their contributors/authors, where feed selector 40 would autonomously generate the desired channel based on metadata identifying relevant incoming user video feeds per criteria entered by the technology blog. Similarly, a cycling community may offer a "ride-along" channel of user video feeds provided by members of the group.

It will be appreciated that a salient difference between the user generated video stream channels provided by server 200 and typical professional video broadcasts may be the lack of central direction and control over the input video feeds by the delivering entity, e.g., server 200. The users providing user video feeds for the most part may act independently of direction provided by server 200, and are not otherwise associated with server 200. It may not be that these users will comply with instructions received from server 200. However, in accordance with embodiments described herein, feed notifier 50 may at least provide some measure of communication between the users and server 200.

For example, feed selector 40 may generate "open mic" channels, for which user video contributors (i.e., users of user video devices 10) may proactively offer to contribute a user video feed to the channel's video stream. Feed selector may select from among the offered contributed user video feeds to generate the output video stream for the channel. In accordance with some embodiments described herein, feed selector 40 may place the offered user video feeds in a delivery queue and forward the details of the delivery queue to feed notifier 50. Feed notifier 50 may then provide the delivery queue details to the user video contributors (e.g. via I/O module 220). The delivery queue details may then be presented on the contributing user video devices 10 in order to inform the users regarding when the offered user video streams will go "live", i.e., when the offered user video streams will be included for delivery in the output video stream. Feed selector 40 may determine the duration of a delivery slot for a given contributed user video feed as a function of at least one of the queue length (i.e., the number of offered user video feeds) and/or the current engagement levels of the audience as provided by audience engagement module 70.

Feed notifier 50 may be configured to notify user video devices 10 regarding current (or imminent) usage of associated user video feeds and/or of an opportunity to be added to a channel's video stream. For example, feed selector 40 may have selected a user video feed from user video device 10A (FIG. 1) for inclusion in a channel's output video stream. Feed notifier 50 may be instructed by feed selector 40 to send a notification to user video device 10B—which is physically nearby to user video device 10A (e.g., per a location tag, or common hashtag for an event)—that a channel's video stream is currently showing a user video feed from the same location. In response, the user of user video device 10B may then provide and/or authorize harvesting of a user video feed from user video device 10B for inclusion in the same channel's output video stream. It will be appreciated that depending on the configuration of user video device 10B, the user may preview the current video stream from the channel by tuning to the channel and/or viewing the video stream via a local client application installed on user video device 10B. Once the second user video feed is available from user video device 10B, feed selector 40 may use it to cut between alternate viewpoints to create a more varied view of a single event.

It will be appreciated that the notifications forwarded to user devices 10 by feed notifier 50 may also include audience feedback details provided by audience engagement module 70. Such feedback may be forwarded to feed notifier 50 via feed selector 40. Alternatively, or in addition, in some embodiments, module 70 may be configured to provide such feedback directly to feed notifier 50. The users of user devices 10 may, for example, use such feedback to provide user generated feeds based on what is currently popular and/or in demand as per the feedback.

Feed notifier 50 may also be configured to provide two-way feedback. For example the user of user video device 10B may send a message to feed notifier 50 indicating an opinion that user video device 10B is positioned in a better viewpoint than another user video device 10 already providing a user video feed to a channel's video stream. Feed selector 40 may then use this message as an additional factor in a feed selection process. Practically speaking, it may be problematic for feed selector 40 to autonomously validate the opinion that user video device 10 is indeed in a better position than another user video device 10. In accordance with some embodiments described herein, feed selector 40 may perform an A/B test to determine which feed to include in the video stream. For example, the two "competing" feeds may be included in different versions of the channel video stream, such that different viewers of the channel get a different mix of the feeds. Audience engagement module 70 may then assess the resulting engagement for the different mixes. Accordingly, a "better position" notification from a user video device 10 may serve to trigger such an A/B test by feed selector 40. Additionally, during an A/B test audience engagement module 70 may enter a proactive mode and directly ask viewers for an opinion, i.e., "which feed provides the better vantage point?" Alternatively, or in addition, feed selector 40 may autonomously initiate such A/B testing via module 70 without prompting from users of user video devices 10.

Audiences, i.e., video content users receiving the video streams (e.g., at video presentation device 60), may switch between the different channels transmitted by server 200 in a generally similar manner to the manner in which television viewers switch channels while watching broadcast television. Depending on the configuration of video presentation device 60, the users may also skip forward and/or backward within a channel's video stream. Further, when starting to view an ongoing live video stream, users may elect to restart the video stream from the beginning of the current video segment, i.e., the beginning of the currently included user video feed. When users reach the end of that video segment, they may continue viewing the user video feed currently being included in the video stream, or time shift to "catch up" on portions of the video stream that were missed while viewing the restarted video segment.

Audiences may also be alerted to trending channels with an invitation to join. For example, a web-based or mobile application associated with system 100 may present trending videos from feed selector 40. Users of this application may view trending videos channels associated with their specific location, or anywhere in the world, or search for a specific event or tag or keyword, or any other metadata associated with the user generated feeds. A user logged into the application may also receive notifications for trending channels matching their interests based on personal preferences, such as, for example, their age group, gender, what they usually watch, what their friends are currently watching, etc.).

Audience engagement module 70 may be configured to measure audience engagement for the output channel video streams generated by feed selector 40. For example, audience engagement module 70 may track the number of active viewers for a given channel and/or a given user video feed within the channel. Module 70 may track other positive engagement signals, such as length of viewing time and/or "likes" from views. The engagement statistics are provided to feed selector 40 for inclusion in, and refinement of, the selection process.

It will be appreciated that a given user video feed may be included in more than one channel's output video stream. In such a case, the engagement statistics may be associated with the source user video feed itself in addition to, or instead of, the channel. The engagement for the same user video feed may differ when included in different channels. Feed selector 40 may be configured to take such differences in consideration when selecting user video feeds for inclusion in channels. Alternatively, or in addition, feed classifier 30 may be configured to use engagement when classifying an incoming user generated feed. For example, engagement may be used to classify a user generated feed as "popular" in order to facilitate inclusion of the popular feed in a "what's trending now?" video stream by feed selector 40.

Audience engagement module 70 may also use user interactions to gauge disengaged usage; for example, rapid channel switching (analogous to channel surfing for broadcast television) without continuous viewing may indicate disengagement. Such disengaged behavior may be used by feed selector 40 to deprioritize particular user video feeds that have apparently caused viewers to switch away from a channel.

Figure 3:
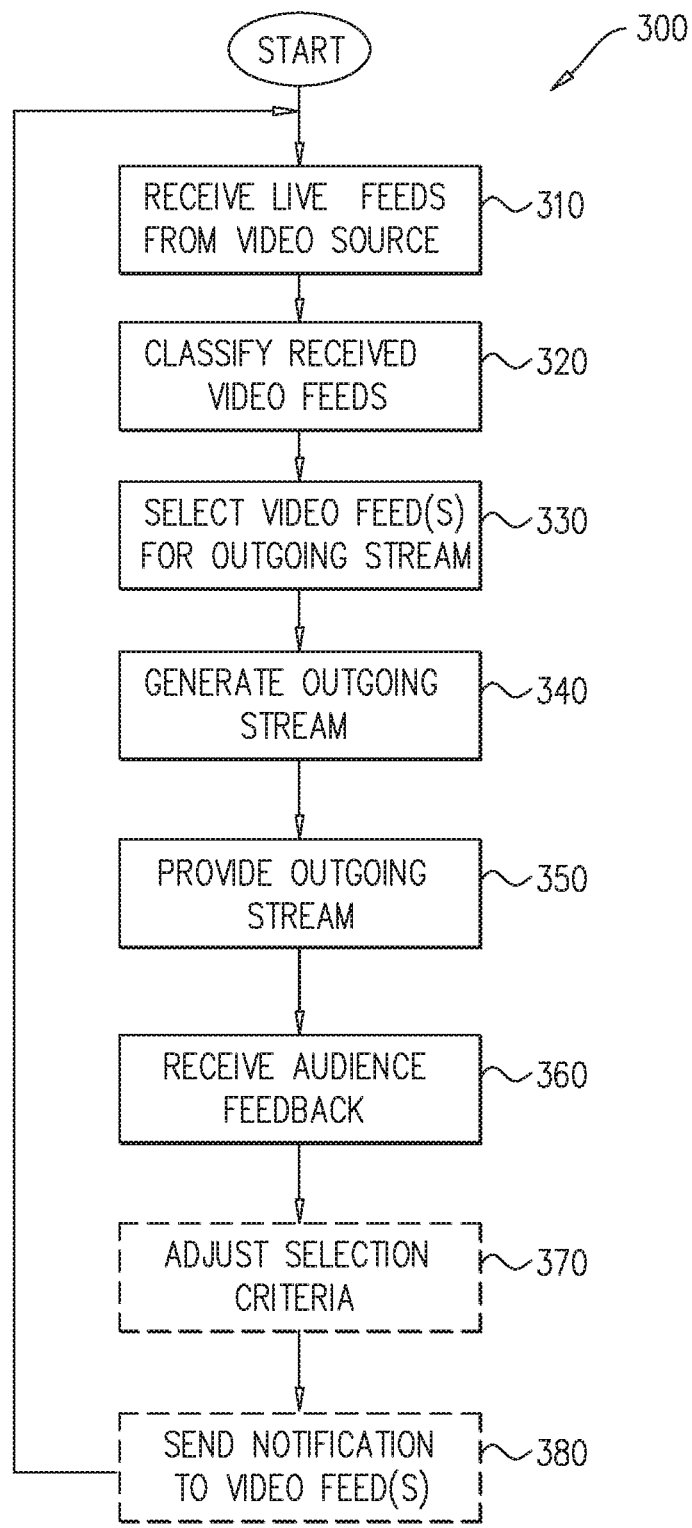
FIG. 3 is a flowchart of an exemplary user generated video delivery process to be performed by the server of FIG. 2.

Reference is now made to FIG. 3 which is an exemplary user generated video delivery process 300 to be performed by server 200. Feed classifier 30 may receive (step 310) live feeds from video sources, e.g., user video feeds 10 (FIG. 1). As described hereinabove, the live feeds are user live feeds that may be harvested from user video publishing sites, and/or received (either directly or indirectly) from user video devices 10. Feed classifier 30 classifies (step 320) the received user video feeds to the extent possible based on a variety of criteria, including, for example: user provided metadata, video quality/resolution, timeline analysis, object detection, etc.

Feed selector 40 may then select (step 330) one or more of the user video feeds to be included in each of a multiplicity of user video channels. Step 330 will be described in greater detail with respect to FIG. 4. Feed selector 40 generates (step 340) an outgoing video stream for each of the multiplicity of user video channels, and employs I/O module 220 (FIG. 2) to provide (step 350) the outgoing video streams to user viewers, e.g., user presentation device 60.

Audience engagement module 70 may receive (step 360) audience feedback from viewers of the user video channels. This feedback may be harvested from online review sites or provided directly to audience engagement module 70 from a client application installed on user presentation devices 60. The feedback may also be inferred from viewing patterns, for example, channel switches, number of viewers, length of viewership, etc.

Based on audience engagement as measured in step 360, feed selector 40 may optionally adjust (step 370) the selection criteria for a given outgoing video stream. Feed selector may also optionally employ feed notifier 50 to send (step 380) notifications to user video devices 10 regarding the user video feeds that they are providing. Such notifications may, for example, serve to inform the user of a user video device 10 that its user video feed will be included in an outgoing video stream; ask for permission to include a given user video feed in an outgoing video stream; suggest changes in video quality/resolution settings for user video device 10; etc.

It will be appreciated that a wide range of inputs may be used to define and maintain continuous viewing experiences (i.e., channel video streams) generated from unstructured and unscheduled user generated video feeds. The sheer numbers and variety of user generated video feeds may preclude ongoing manual definition of a comprehensive offering of channel video streams. Evaluating all of the associated feedback and adjusting selection criteria accordingly may effectively render manual operation of the selection process impractical. The successful generation of a continuous viewing experience from unstructured and unscheduled user generated video feeds may therefore be contingent on intelligent autonomous feed selection, such as provided by feed selector 40.

Figure 4:
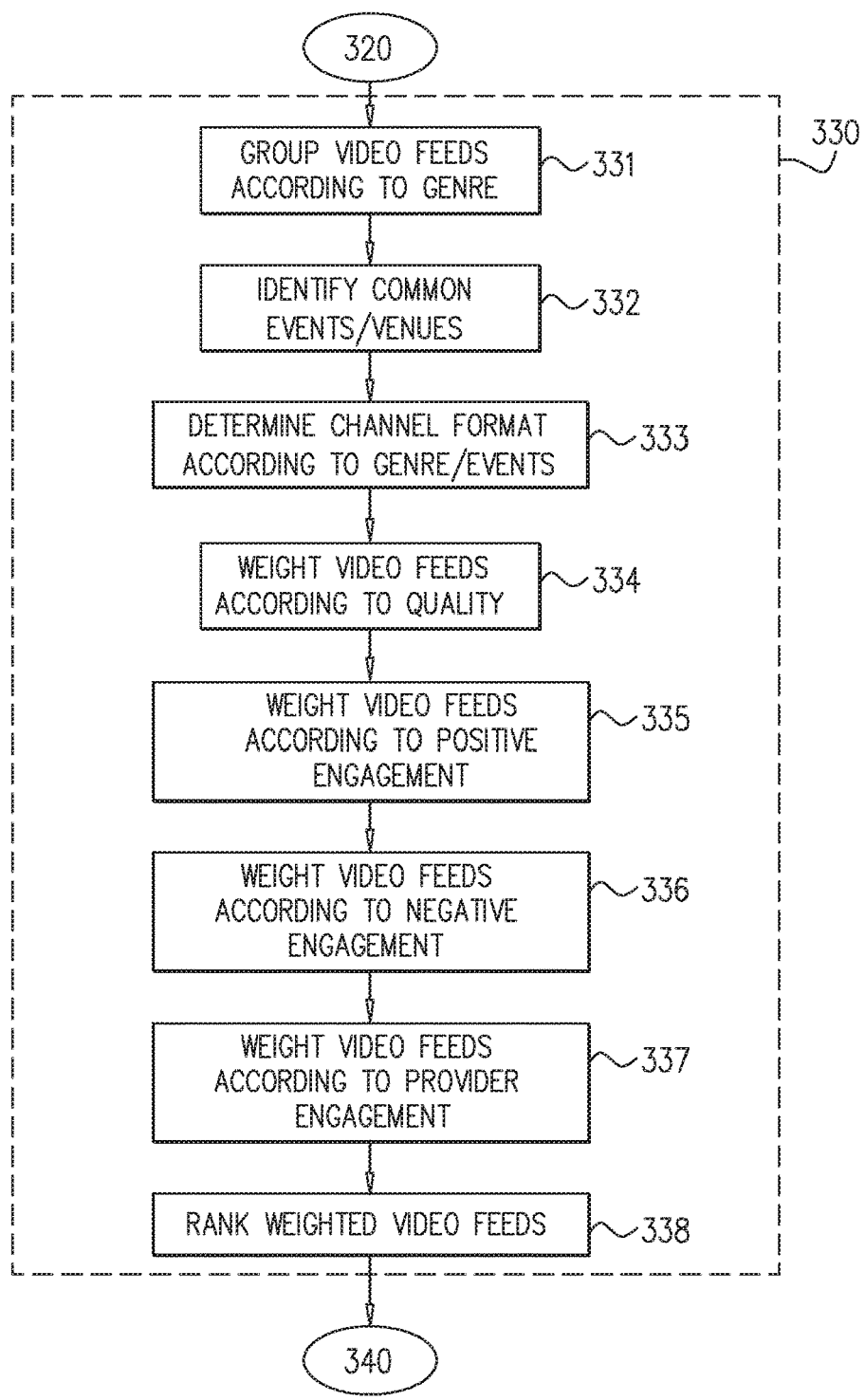
FIG. 4 is a flowchart of an exemplary user video feed selection process to be performed as a sub-process of the process of FIG. 3.

Reference is now made to FIG. 4 which is a more detailed flowchart of step 330 from FIG. 3 as performed by feed selector 40. Feed selector 40 may group (step 331) video feeds according to genre. It will be appreciated that the video feeds may be classified user video feeds received from feed classifier 30 after step 320 of process 300.

Feed selector 40 may also identify (step 332), or at least attempt to identify, common events and/or venues for the received video feeds as per the metadata provided by feed classifier 30. Based on the genre and/or the identified events/venues, feed selector 40 may determine (step 333) a channel format to be used for presenting the channel to be generated. For example, in a standard format, one user video feed may be selected and continually provided for viewing until the user video feed stops. For a live concert, multiple user video feeds may be spliced together to show individual band members or the audience, while the audio track may be selected from the highest audio quality as classified by feed classifier 30. For a sports magazine, user video feeds may be alternated whenever there is a break in the action.

Feed selector 40 may weight (step 334) the video feeds according to quality. It will be appreciated that there may be more than one type of quality weighted, and the weight applied may be a function of the channel format determined in step 333. For example, in a live video feed from a disaster site, the audio quality may be weighted differently than the video quality.

Feed selector 40 may weight (step 335) the video feeds according to positive audience engagement as measured by audience engagement module 335. Positive audience engagement may represent ongoing audience feedback received by module 70 for a currently provided video stream. It will be appreciated that audience engagement may also represent historical feedback for a given user video feed provider; for example, a user that received positive feedback in the past may generally be expected to be more likely to receive positive feedback going forward than an unknown provider. Audience engagement module 70 may be configured to collate and store such feedback. Feed selector may also weight (step 336) the video feeds according to negative audience engagement in a generally similar manner.

In accordance with embodiments described herein, providers of user video feeds may also proactively provide feedback in the form of notifications sent to feed notifier 50. For example, such feedback may be an indication that the provider is in a better position to provide a quality view of an ongoing event than the user video feed currently included in a channel for the ongoing event. Feed selector 40 may be configured to also weight (step 337) the user generated feeds according to such feedback. Alternatively, or in addition, feed classifier 30 may be configured to use such feedback in step 320 (FIG. 3). It will be appreciated that the weight accorded to such feedback may also be a function of historical positive audience engagement received for the provider in question.

Feed selector 40 may then rank (step 338) the individual user video feeds according to at least the weighted results of steps 334-337. It will be appreciated that steps 334-338 may be performed on a periodic or continual basis in order to account for changes in audience engagement, video quality, provider feedback, etc. Once the user video feeds have been ranked, process control may continue to step 340 (FIG. 3).

It is appreciated that software components of the present invention may, if desired, be implemented in ROM (read only memory) form. The software components may, generally, be implemented in hardware, if desired, using conventional techniques. It is further appreciated that the software components may be instantiated, for example: as a computer program product or on a tangible medium. In some cases, it may be possible to instantiate the software components as a signal interpretable by an appropriate computer, although such an instantiation may be excluded in certain embodiments of the present invention.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the invention is defined by the appended claims and equivalents thereof:

What is claimed is:

1. A method for generating ad hoc video stream channels, the method comprising:
   receiving a multiplicity of incoming user video feeds, wherein schedules for the multiplicity incoming user video feeds are unknown;
   classifying the multiplicity of incoming user video feeds according to a genre;
   selecting an incoming video feed from among the multiplicity of incoming user video feeds for inclusion in a video stream channel, wherein the multiplicity of incoming video feeds are received from a plurality of user devices, and wherein selecting the incoming video feed comprises:
      identifying a common event at which the multiplicity of incoming user video feeds are produced, wherein identifying the common event comprises identifying objects in frames of the multiplicity of incoming user video feeds,
      selecting the incoming video feed from among the multiplicity of incoming user video feeds with the common event for inclusion the video stream channel, and
      notifying a user device providing the selected incoming video feed regarding selection of the incoming video feed from among the multiplicity of incoming user video feeds;
   generating an outgoing video stream for the video stream channel comprising the selected incoming video feed; and
   delivering the outgoing video stream to presentation devices.

2. The method of claim 1, wherein selecting the incoming video feed comprises weighting the multiplicity of incoming user video feeds according to the video quality.

3. The method of claim 1, further comprising:
   receiving audience engagement feedback from the presentation devices, wherein the audience engagement feedback is indicative of a level of engagement of viewers of the video stream channel; and
   updating selection criteria according to the user engagement feedback.

4. The method of claim 3, wherein updating the selection criteria comprises:
   updating the selection criteria according to historical user engagement feedback compiled over time.

5. The method of claim 3, wherein the selection criteria is further based on positive engagement expressed in the audience engagement feedback, and wherein selecting the incoming video feed comprises weighting the multiplicity of incoming user video feeds according to the positive engagement.

6. The method of claim 3, wherein the selection criteria is further based on negative engagement expressed in the audience engagement feedback, and wherein selecting the incoming video feed comprises weighting the multiplicity of incoming user video feeds according to the negative engagement.

7. The method of claim 3, wherein:
   generating the outgoing video stream further comprises generating at least two versions of the outgoing video stream;
   delivering the outgoing video stream further comprises delivering the at least two versions to the presentation devices, wherein some of the presentation devices receive one of the at least two versions, and others of the presentation devices receive another of the at least two versions; and
   selecting the incoming video feed further comprises performing an AB test using the audience engagement feedback to determine which of the at least two versions is preferred by viewers of the outgoing video stream.

8. The method of claim 1, further comprising:
   receiving provider feedback from a provider of at least one of the multiplicity of incoming user video feeds; and wherein selecting the incoming video feed comprises weighting the multiplicity of incoming user video feeds according to a provider feedback.

9. The method of claim 1, further comprising:
   determining a channel format for the same video stream channel according to at least one of the following: the genre and the common event.

10. The method of claim 1, wherein identifying the common event comprises:
    harvesting metadata from the multiplicity of incoming user video feeds.

11. The method of claim 1, wherein the receiving, classifying, selecting, generating, and delivering are performed autonomously without manual intervention.

12. The method of claim 1, wherein the multiplicity of incoming user video feeds are live video feeds.

13. The method of claim 1, wherein receiving the multiplicity of incoming user video feeds comprises:
    harvesting the multiplicity of incoming user video feeds from published user video feeds.

14. The method of claim 1, further comprising:
    detecting termination of the incoming video feed; and
    replacing the incoming video feed in the outgoing video stream channel with another incoming video feed selected from among the multiplicity of incoming user video feeds.

15. The method of claim 1, wherein receiving the multiplicity of incoming user video feeds comprises:
    notifying a user video device of an opportunity to provide a specific user video feed from among the multiplicity of incoming user video feeds, wherein the specific user video feed is associated with a specific location or event.

16. A non-transitory computer readable medium that stores a set of instructions, which when executed by a processing unit performs a method comprising:
    receiving a multiplicity of incoming user video feeds, wherein schedules for the multiplicity of incoming user video feeds are unknown;
    classifying the multiplicity of incoming user video feeds based on a genre;
    selecting an incoming video feed from among the multiplicity of incoming user video feeds for inclusion in a video stream channel, wherein selecting the incoming video feed from among the multiplicity of incoming user video feeds comprises:
       identifying a common event at which the multiplicity of incoming user video feeds are produced, wherein identifying the common event comprises identifying objects in frames of the multiplicity of incoming user video feeds, and
       selecting the incoming video feed from among the multiplicity of incoming user video feeds with the common event for inclusion the video stream channel;

generating an outgoing video stream for the video stream channel based on the selected incoming video feed; and delivering the outgoing video stream to presentation devices.

17. The non-transitory computer readable medium of claim 16, wherein the method further comprising:

suggesting a modification in settings of the user device providing the selected incoming video feed.

18. The non-transitory computer readable medium of claim 16, wherein the method further comprising:

receiving an indication from another user device, the indication comprising a notification that the another user device is in a better position to provide a view of the common event than the user device providing the selected incoming video feed.

19. A system for generating ad hoc video stream channels, the system comprising:

an I/O module configured to:
  receive a multiplicity of incoming user video feeds, wherein schedules for the multiplicity incoming user video feeds are unknown, and
  deliver a video stream channel generated from the multiplicity of incoming user video feeds to a multiplicity of presentation devices;

a processor;

a feed classifier application executable by the processor to classify the multiplicity of incoming user video feeds according to a genre; and a feed selector application executable by the processor to:
  select at least one incoming video feed from among the multiplicity of incoming user video feeds for inclusion in the video stream channel, wherein the feed selector being caused to select the incoming video feed comprises the feed selector being caused to:
    identify a common event at which the multiplicity of incoming user video feeds are produced, wherein identifying the common event comprises identifying objects in frames of the multiplicity of incoming user video feeds, and
    select the incoming video feed from among the multiplicity of incoming user video feeds with the common event for inclusion the video stream channel, and
    generate at least one outgoing video stream for the video stream channel from the at least one incoming video feed; and an audience engagement module configured to provide audience engagement feedback from the multiplicity of presentation devices, wherein the audience engagement feedback is indicative of a level of engagement for viewers of the video stream channel, wherein the feed selector application is further configured to adjust the selection criteria based on the audience engagement feedback.

20. The system of claim 19, wherein the feed selector is further operative to:

notify a user video device of an opportunity to provide a specific user video feed from among the multiplicity of incoming user video feeds, wherein the specific user video feed is associated with a specific location or event.

* * * * *